United States Patent
Zhao et al.

(10) Patent No.: US 9,274,215 B2
(45) Date of Patent: Mar. 1, 2016

(54) ULTRASOUND FUSION HARMONIC IMAGING SYSTEMS AND METHODS

(71) Applicant: CHISON MEDICAL IMAGING CO., LTD., Wuxi, Jiangsu Province (CN)

(72) Inventors: Danhua Zhao, Wuxi (CN); Yong Zhang, Wuxi (CN); Ruoli Mo, Wuxi (CN)

(73) Assignee: Chison Medical Imaging, Inc., Jiangsu (CN)

( * ) Notice: Subject to any disclaimer, the term of this patent is extended or adjusted under 35 U.S.C. 154(b) by 469 days.

(21) Appl. No.: 13/790,322

(22) Filed: Mar. 8, 2013

(65) Prior Publication Data

US 2014/0254307 A1   Sep. 11, 2014

(51) Int. Cl.
- *G01S 7/52* (2006.01)
- *G01S 15/02* (2006.01)
- *G01S 7/523* (2006.01)
- *G01S 15/89* (2006.01)

(52) U.S. Cl.
CPC ............... *G01S 7/523* (2013.01); *G01S 7/5202* (2013.01); *G01S 7/52026* (2013.01); *G01S 7/52077* (2013.01); *G01S 15/8906* (2013.01); *G01S 7/52044* (2013.01)

(58) Field of Classification Search
CPC . G01S 7/523; G01S 15/8906; G01S 7/52026; G01S 7/52077; G01S 7/5202; G01S 7/52044
See application file for complete search history.

(56) References Cited

U.S. PATENT DOCUMENTS

| | | | |
|---|---|---|---|
| 5,632,277 A | 5/1997 | Chapman | |
| 5,740,128 A | 4/1998 | Hossack | |
| 5,833,614 A | 11/1998 | Dodd | |
| 5,897,500 A | 4/1999 | Zhao | |
| 5,913,823 A | 6/1999 | Hedberg | |
| 5,980,459 A | 11/1999 | Chiao | |
| 6,226,228 B1* | 5/2001 | Hossack et al. | 367/7 |
| 6,340,348 B1* | 1/2002 | Krishnan et al. | 600/447 |
| 6,458,083 B1 | 10/2002 | Jago | |
| 6,572,549 B1* | 6/2003 | Jong et al. | 600/443 |
| 6,866,631 B2 | 3/2005 | McLaughlin | |
| 7,226,416 B2 | 6/2007 | McLaughlin | |
| 7,699,781 B2 | 4/2010 | McLaughlin | |
| 2003/0114755 A1* | 6/2003 | Jong et al. | 600/437 |
| 2007/0059247 A1* | 3/2007 | Lindner et al. | 424/9.52 |
| 2014/0254307 A1* | 9/2014 | Zhao et al. | 367/7 |

* cited by examiner

*Primary Examiner* — Daniel Pihulic
(74) *Attorney, Agent, or Firm* — Finnegan, Henderson, Farabow, Garrett & Dunner, LLP

(57) ABSTRACT

An ultrasound imaging system includes: a harmonic filter coupled to an ultrasound transmitter to reduce transmitted harmonic components; a fundamental filter coupled with an ultrasound receiver to reduce received fundamental components; and a fusion processor configured to generate multiple frames of fusion images for two subsequent frames of ultrasound transmissions to improve frame rate. The ultrasound receiver may optionally perform signal alignment and matching to improve image quality. To improve image quality, the ultrasound system may optionally use multiple amplitude-modulated transmit pulses with different delays, or multiple transmit pulses with different amplitudes to extract harmonic signals.

18 Claims, 5 Drawing Sheets

ULTRASOUND FUSION HARMONIC IMAGING SYSTEMS AND METHODS

FIELD OF THE TECHNOLOGY

The present disclosure related to ultrasound imaging systems in general and more particularly, but not limited to, fusion harmonic imaging techniques.

BACKGROUND

Medical ultrasound images have noises and artifacts. Various techniques have been developed and utilized to reduce noise and improve image quality.

For example, U.S. Pat. No. 5,632,277 discloses an ultrasound imaging system employing phase inversion subtraction to enhance the image generated, in which first and second amplitude modulated harmonic ultrasound signals that differ by 180 degrees in phase are transmitted to generate echo signals that are measured and combined to form ultrasound images. U.S. Pat. Nos. 6,866,631, 7,226,416, and 7,699,781 disclose variations of phase inversion ultrasonic imaging using multiple sets of transmit pulses differing in amplitude, frequency, phase, and/or pulse width.

U.S. Pat. Nos. 5,740,128, 5,833,614, and 5,913,823 disclose ultrasonic harmonic imaging systems in which ultrasonic energy is transmitted at a fundamental frequency and reflected ultrasonic energy is received at a harmonic of the fundamental frequency. In U.S. Pat. Nos. 5,740,128 and 5,913,823, ultrasonic energy is transmitted in power bursts, each having a respective envelope shape rising gradually to a respective maximum value and fall gradually from the respective maximum value. In U.S. Pat. No. 5,833,614, pulses of different durations are used.

U.S. Pat. No. 5,980,459 disclosed a technology that utilizes phase-coded pulses and slow-time filtering to obtain harmonic signals.

In order to improve harmonic imaging performance, other ultrasound methods like compounding are added to the harmonic imaging mode. For example, U.S. Pat. Nos. 5,897,500 and 6,458,083 disclose combining both fundamental and harmonic signals to form a compounded image.

The entire disclosures of the above discussed U.S. patents related to harmonic imaging techniques are hereby incorporated herein by reference.

Although some of the methods are effective in improving image qualities, they may introduce drawbacks in other areas. For instance, most current Tissue Harmonic Imaging (THI) techniques have drawbacks in penetration loss and frame rate reduction.

SUMMARY OF THE DESCRIPTION

Some embodiments are summarized in this section.

In one aspect, an ultrasound imaging system, includes an ultrasound transducer; a transmit beamformer; a receiver beamformer; a harmonic filter coupled between the ultrasound transducer and the transmit beamformer to reduce transmitted harmonic components; a fundamental filter coupled between the ultrasound transducer and the receiver beamformer to reduce received fundamental components; and a fusion processor configured to generate multiple frames of fusion images from two subsequent frames of ultrasound transmissions.

The ultrasound imaging system may further include: a transmit/receive switch configured to couple either the transmit beamformer or the receive beamformer to the ultrasound transducer.

The ultrasound imaging system may further include: a first switch configured to connect the harmonic filter between the transmit beamformer and the transmit/receive switch when in a first mode and to connect the transmit beamformer to the transmit/receive switch without going through the harmonic filter when in a second mode.

The ultrasound imaging system may further include: a second switch configured to connect the fundamental filter between the receive beamformer and the transmit/receive switch when in a first mode and to connect the receive beamformer to the transmit/receive switch without going through the fundamental filter when in a second mode.

In the ultrasound imaging system, the harmonic filter can be configured to adjust at least one of delay, phase and amplitude of a pulse supplied by the transmit beamformer.

In the ultrasound imaging system, the transmit beamformer can be configured to generate two pulses for the two subsequent frames of ultrasound transmissions. The two pulses may differ in at least one of: delay, phase, frequency, duration, width, and amplitude.

In the ultrasound imaging system, the receiver beamformer can be configured to receive and store two beams formed as echoes of the two pulses; and the fusion processor can be configured to extract a harmonic frame and a fundamental frame from the two beams.

In the ultrasound imaging system, the fusion processor can be configured to perform alignment and matching of the two beams to extract the harmonic frame and the fundamental frame.

In the ultrasound imaging system, the two pulses are identical in one embodiment; and the harmonic filter is applied to a first one of the two pulses and not to a second one of the two pulses.

In the ultrasound imaging system, the ultrasound transducer is used in another embodiment to transmit multiple amplitude-modulated transmit pulses with different delays for the two subsequent frames of ultrasound transmissions.

In the ultrasound imaging system, the ultrasound transducer is used in a further embodiment to transmit multiple pulses with different amplitudes to extract harmonic signals.

In the ultrasound imaging system, the receive beamformer may include a high-dynamic range, low-noise, high-gain amplifier to boost harmonic signals; and its gain is reduced for receiving fundamental signals to avoid signal saturation.

In the ultrasound imaging system, the two pulses are identical in one embodiment; and the fundamental filter is used in receive echoes from a first one of the two pulses and not a second one of the two pulses.

In another aspect, an ultrasound imaging system includes: an ultrasound transmitter having a harmonic filter configured to reduce transmitted harmonic components; an ultrasound receiver having a fundamental filter configured to reduce received fundamental components; and a fusion processor configured to combine a harmonic frame and a fundamental frame derived from two reflected beams to generate a fused frame; where the harmonic filter is applied to a first pulse to generate a first beam of the two reflected beams but not to a second pulse identical to the first pulse. In some embodiments, the ultrasound transmitter includes a switch, which switch when in a first mode applies the harmonic filter for the first pulse and when in a second mode bypasses the harmonic filter for the second pulse.

In a further aspect, an ultrasound imaging system, includes: an ultrasound transmitter having a harmonic filter configured to reduce transmitted harmonic components; an ultrasound receiver having a fundamental filter configured to reduce received fundamental components; and a fusion processor configured to combine a harmonic frame and a fundamental frame derived from two reflected beams to generate a fused frame; where the fundamental filter is applied to a first beam of the two reflected beams but not to a second beam of the reflected beams. In some embodiments, the first beam and the second beam are generated based on identical pulses from the ultrasound transmitter; and the ultrasound receiver includes a switch, which switch when in a first mode applies the fundamental filter to the first beam and when in a second mode bypasses the fundamental filter for the second beam. The ultrasound receiver may further include a high-dynamic range, low-noise, high-gain amplifier to boost harmonic signals, with reduced gain for fundamental signals.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one. Features discussed in connection with one or an embodiment can be optionally included in the same embodiment.

The ultrasound imaging techniques disclosed below can address at least some of the problems and limitations of the aforementioned systems and methods discussed in the background section.

Figure 4:
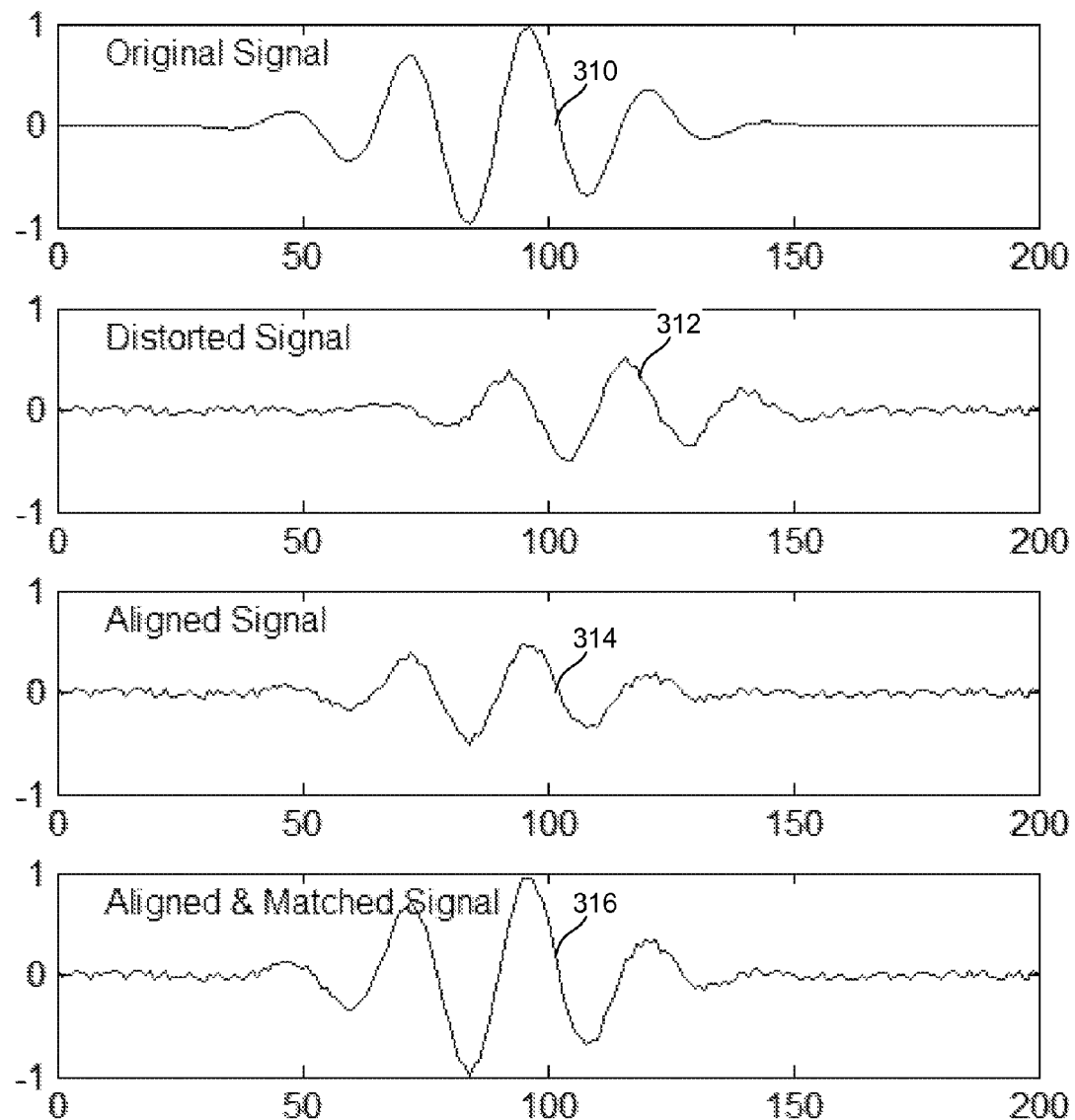
Figure 6:
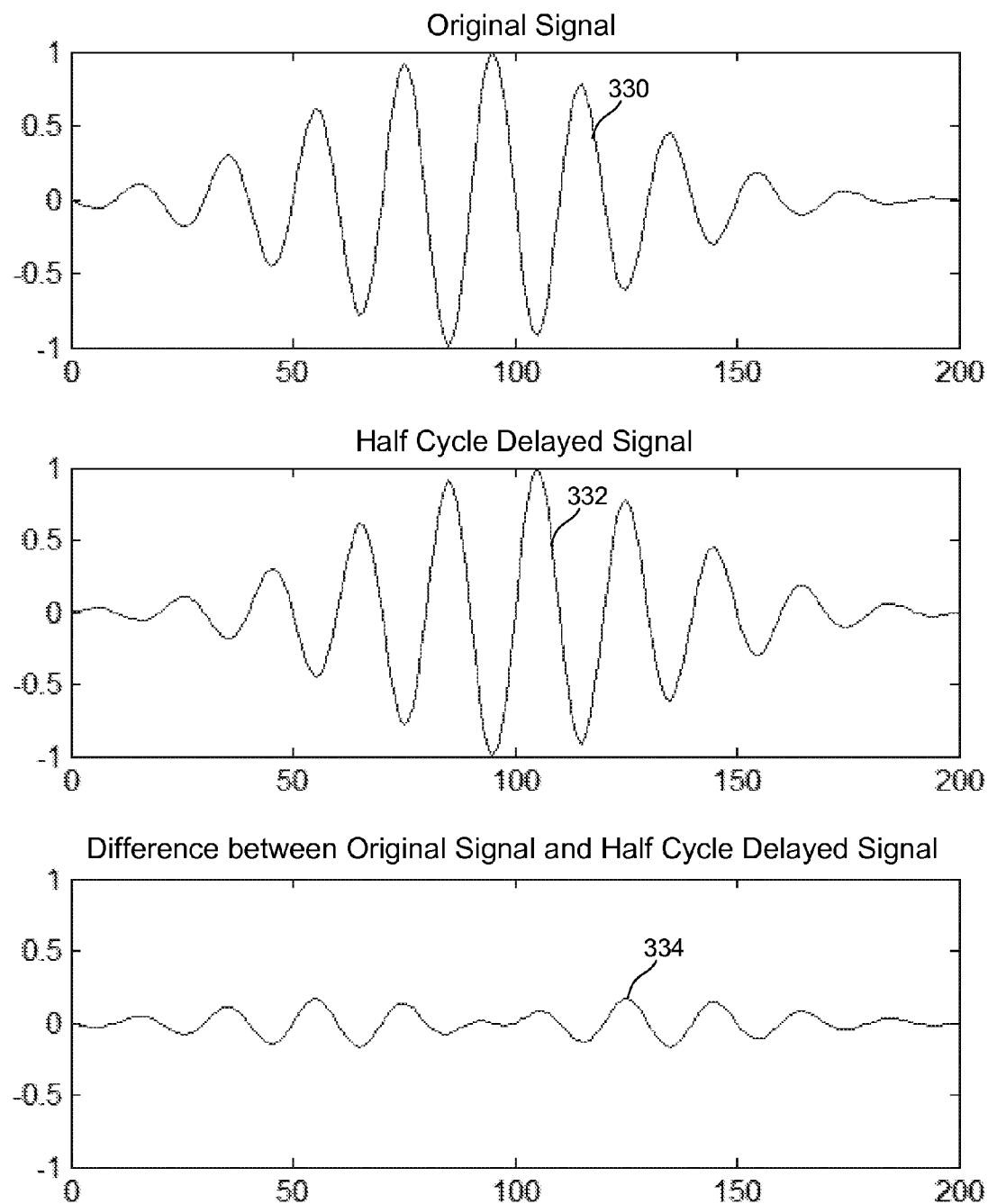
FIG. 6 shows an example of transmit delay based harmonic imaging.
Figure 7:
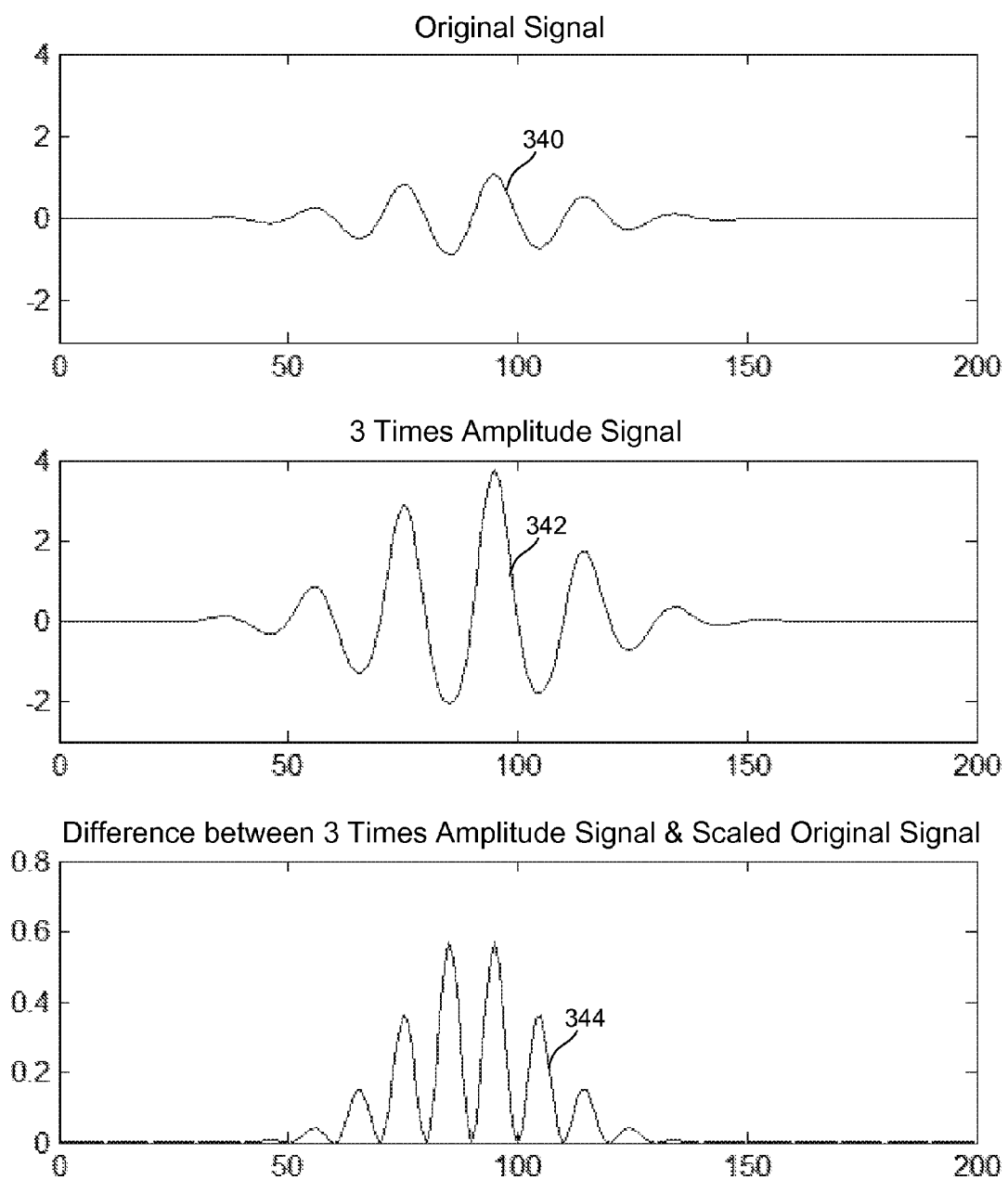
FIG. 7 shows an example of transmit amplitude based harmonic imaging.

One embodiment of an ultrasound imaging system of the present disclosure includes: a harmonic filter coupled to the ultrasound transmitter to reduce transmitted harmonic components; a fundamental filter coupled with the ultrasound receiver to reduce received fundamental components; a fusion processor configured to generate multiple frames of fusion images for two subsequent frames of ultrasound transmissions to improve frame rate. The ultrasound receiver may optionally perform signal alignment and matching to improve image quality (e.g., as illustrated in FIG. 4). To improve image quality, the ultrasound system may optionally use multiple amplitude-modulated transmit pulses with different delays (as illustrated in FIG. 6), or multiple transmit pulses with different amplitudes to extract harmonic signals (as illustrated in FIG. 7).

Figure 1:
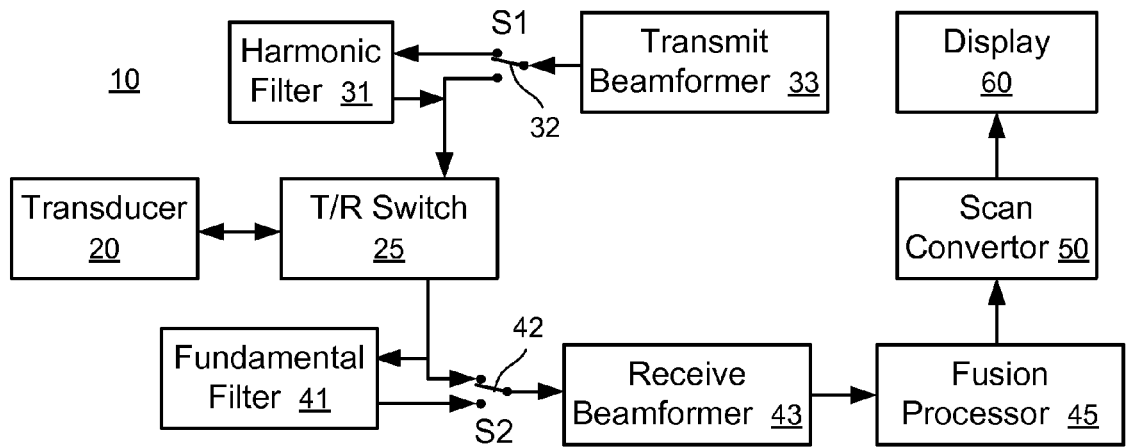
FIG. 1 shows a block diagram of a medical ultrasound imaging system.

FIG. 1 shows a block diagram of a medical ultrasound imaging system. The medical ultrasound imaging system has improved image quality using both fundamental and harmonic signals. In FIG. 1, the medical ultrasound imaging system (10) includes an ultrasound transducer (20), an electronic system, and a display (60). The electronic system includes a transmit beamformer (33), a harmonic filter (31), a transmit/receive (T/R) switch (25), a fundamental filter (41), a receive beamformer (43), a fusion processor (45), and a scan convertor (50).

In FIG. 1, the transmit beamformer (33) generates various transmit pulses with different frequencies, delays, pulse widths (cycle count), envelope, and amplitudes.

In FIG. 1, the harmonic filter (31) removes or reduces harmonic components in the transmit pulses. The harmonic filter (31) can be implemented via a digital circuitry, an analog circuitry, or a combination of digital and analog circuitry. The harmonic filter (31) can include either a bandpass or a lowpass filter. The cutoff frequency of the harmonic filter (31) may be programmable depending on operating frequency. The harmonic filter (31) is further controllable to change delay, phase, and amplitude of transmit pulses in one embodiment.

In FIG. 1, a switch S1 (32) is configured to selectively couple the harmonic filter (31) between the T/R switch (25) and the transmit beamformer (33), or bypass the harmonic filter (31). When the switch S1 (32) is in a first position/mode, the transmit beamformer (33) is connected to the T/R switch (25) via the harmonic filter (31); and when the switch S1 (32) is in a second position/mode, the transmit beamformer (33) is connected to the T/R switch (25) without going through the harmonic filter (31).

In FIG. 1, the T/R switch (25) separates the transmitter (e.g., transmit beamformer 33 and harmonic filter 31) and the receiver (e.g., fundamental filter 41 and receiver beamformer 43) and connects the transmitter and the receiver to the transducer (20) one at a time.

In FIG. 1, the fundamental filter (41) includes an analog filter for removing or reducing fundamental frequency component of the received signals. The analog filter can be either a bandpass or a highpass filter. The cutoff frequency of the fundamental filter (41) may be programmable depending on operating frequency.

In FIG. 1, a switch S2 (42) is configured to selectively couple the fundamental filter (41) between the T/R switch (25) and the receive beamformer (43), or bypass the fundamental filter (41). When the switch S2 (42) is in a first position/mode, the T/R switch (25) is connected to the receive beamformer (43) via the fundamental filter (41); and when the switch S2 (42) is in a second position/mode, the T/R switch (25) is connected to the receive beamformer (43) without going through the fundamental filter (41).

In FIG. 1, the receive beamformer (43) generates acoustic beams by applying proper delays and apodization to selected receive signals before summing them.

In FIG. 1, the fusion processor (45) processes the current input beam and previously stored input beams to generate fundamental and harmonic signals. The fusion processor (45) further analyzes fundamental and harmonic signals to intelligently mix the two components to form a compounded scan line.

In FIG. 1, the scan convertor (50) processes multiple scan lines to form a frame of display image according to the geometry of the transducer (20) and scan format.

In one preferred embodiment, the transmit beamformer (33) generates a pair of identical pulses. The harmonic filter (31) includes a lowpass invert filter with cutoff frequency that is between the fundamental frequency and the second harmonic frequency. For instance, if the fundamental frequency is 2.5 MHz and the second harmonic frequency is 5 MHz, then the cutoff frequency can be 3.3 MHz to 4.0 MHz. The switch S1 (32) is configured to connect the harmonic filter (31) to one of the two pulses in the pair, but not the other. The fundamental filter (41) includes a low order highpass filter with cutoff frequency that is between the fundamental frequency and the second harmonic frequency. The fusion processor (45) is configured to extract harmonic signals by adding two consecutive received beams, received as echo signals of the pair of transmitted pulses, while obtaining fundamental signals by subtracting one receive beam from the other. Both the fundamental signals and the harmonic signals go through a magnitude detector before being summed to form a compounded beam.

In an alternative embodiment, the transmit beamformer (33) generates a pair of different pulses. Differences in the pair of pulses can be in phase, frequency/duration, amplitude, or two or all of them. For instance, the first pulse can be different from the second pulse in phase, duration, and/or amplitude. The harmonic filter (31) includes a low order lowpass filter with cutoff frequency that is between the fundamental frequency and the second harmonic frequency. The fundamental filter (41) is a low order highpass filter with cutoff frequency that is between the fundamental frequency and the second harmonic frequency. The fusion processor (45) is configured to align in time domain two consecutive received beams, received as echo signals of the pair of transmitted pulses, then adjust the amplitude of one beam to match the amplitude of the other beam, and then extract harmonic signals by adding the two aligned and matched beams while obtaining fundamental signals by subtracting one receive beam from the other. Both the fundamental signals and the harmonic signals go through magnitude detection before being summed to form a compounded beam for the generation of an ultrasound image.

In a further alternative embodiment, the transmit beamformer (33) generates a pair of different pulses. The difference in the pair of pulses is in delay. For instance, the first pulse is half cycle behind the second pulse in delay. Each of the pulses is at least three-cycle long and have a triangle-like envelope. The harmonic filter (31) is a low order lowpass filter with cutoff frequency that is between the fundamental frequency and the second harmonic frequency. The fundamental filter (41) is a low order highpass filter with cutoff frequency that is between the fundamental frequency and the second harmonic frequency. The fusion processor (45) extracts harmonic signals by adding the two consecutive reflected beams, while obtaining fundamental signals by subtracting one received beam from the other. Both the fundamental signals and the harmonic signals go through magnitude detection before being summed to form a compounded beam for the generation of an ultrasound image.

In a yet another embodiment, the transmit beamformer (33) generates a pair of different pulses. The difference in the pair of pulses is in amplitude. For instance, the first pulse is at least 2 times as large as the second pulse in amplitude. The harmonic filter (31) is a low order lowpass filter with cutoff frequency that is between the fundamental frequency and the second harmonic frequency. The fundamental filter (41) is a low order highpass filter with cutoff frequency that is between the fundamental frequency and the second harmonic frequency. The fusion processor (45) scales the smaller receive beam by the same scaling factor used for transmit pulses. For instance, the second receive beam is multiplied by 3 if the first transmit pulse is 3 times as large as the second pulse. The fusion processor (45) then extracts harmonic signals by subtracting the scaled receive beam from the other un-scaled beam while obtaining fundamental signals by adding the two consecutive received beams. Both the fundamental signals and the harmonic signals go through magnitude detection before being summed to form a compounded beam for the generation of an ultrasound image.

In a furthermore embodiment, the transmit beamformer generates a pair of identical pulses. The harmonic filter (31) is a simple lowpass filter with cutoff frequency that is between the fundamental frequency and the second harmonic frequency. The fundamental filter (41) is a high order highpass filter with cutoff frequency that is between the fundamental frequency and the second harmonic frequency. The fundamental filter (41) is applied to only one of the two consecutive received beams. The receive beamformer (43) employs a high-dynamic range, low-noise, high-gain amplifier to boost weak harmonic signals. For the fundamental beams, however, the gain is reduced to avoid signal saturation. Since the fundamental filter (41) and the receive beamformer (43) can extract harmonic signals and fundamental signals, the fusion processor (45) mixes the fundamental signals and harmonic signals extracted by the fundamental filter (41) and the receive beamformer (43) to form a compounded beam for the generation of an ultrasound image.

Figure 2:
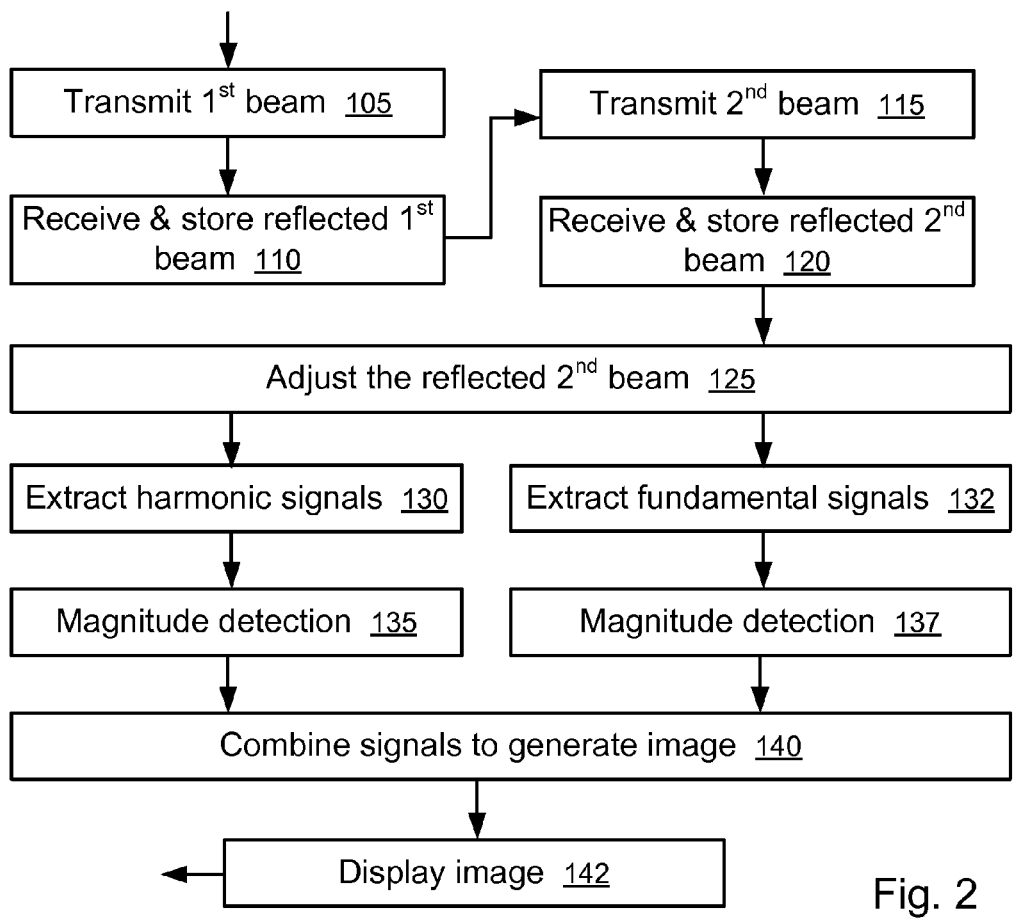
FIG. 2 shows a flowchart of one preferred embodiment.

FIG. 2 shows a flowchart of one preferred embodiment. In FIG. 2, the T/R switch (25) of the ultrasound imaging system (10) illustrated in FIG. 1 is configured to connect the transmit beamformer (33) to the transducer (20) to transmit (105) a first beam of a pair of beams, and then connect the receive beamformer (43) to the transducer (20) to receive and store (110) (e.g., in a digital format) the reflected first beam of the pair.

Subsequently, the T/R switch (25) of the ultrasound imaging system (10) is configured to connect the transmit beamformer (33) to the transducer (20) to transmit (115) a second beam of the pair of beams, and then connect the receive beamformer (43) to the transducer (20) to receive and store (120) (e.g., in a digital format) the reflected second beam of the pair.

Subsequently, the fusion processor (45) is configured to adjust the reflected second beam of the pair to align and match with the reflected first beam to compensate the difference(s) between the received first beam and the received second beam.

In one embodiment of FIG. 2, the fusion processor (45) is configured to extract (130) harmonic signals by adding the reflected first beam and the reflected, adjusted second beam, and extract (132) fundamental signals by subtracting the reflected first beam from the reflected, adjusted second beam (or subtracting the reflected, adjusted second beam from the reflected first beam).

In another embodiment of FIG. 2, the fundamental filter (41) and the receive beamformer (43) are configured to extract fundamental signals and harmonic signals (e.g., via a high-dynamic range, low-noise, high-gain amplifier for harmonic signals, reduced gain for fundamental signals, and the application of fundamental filter (41) to the harmonic beam but not the other).

In FIG. 2, magnitude detections (135 and 137) are performed for the extracted fundamental signals and extracted harmonic signals. The fusion processor (45) combines (140) (e.g., summing) the results of the magnitude detections (135 and 137) to generate an ultrasound image, which is displayed (142) on the display (60) of the ultrasound imaging system (10).

The above embodiments can be extended to three or more transmit pulses.

Figure 3:
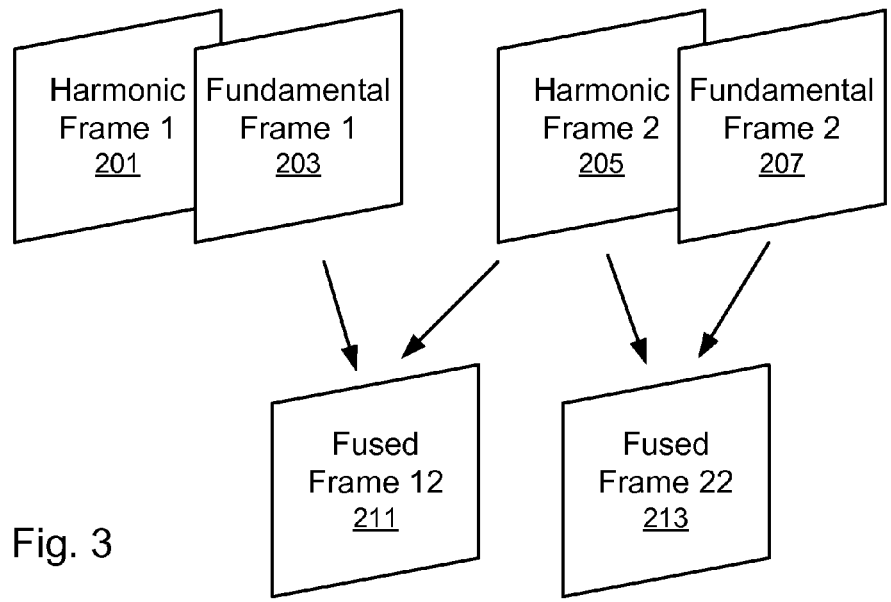
FIG. 3 shows how to create two compounded images.

To improve frame rate, a novel fusion method is developed as illustrated in FIG. 3.

Traditionally, a pair of transmitted pulses is used to generate one compounded beam. Successive pairs of transmitted pulses are combined to generate an intermediate compounded beam to increase frame rate. For example, in addition to a compounded beam generated from the combination of the current harmonic beam and the current fundamental beam, a further compounded beam can be generated from combination of the current harmonic beam and the previous fundamental beam, where the fundamental beam can be derived from either a single transmit pulse or multiple transmit pulses.

For example, in FIG. 3, a first pair of transmitted pulses is used to generate a pair of a first harmonic frame (201) and a first fundamental frame (203); and a second pair of transmitted pulses is used to generate a pair of a second harmonic frame (205) and a second fundamental frame (207). Each pair of harmonic and fundamental frames (e.g., 201 and 203; or 205 and 207) can be combined to generate a fused frame. For example, a pair of a second harmonic frame (205) and a second fundamental frame (207) can be combined to generate a fused frame (213) by the fusion processor (45). In FIG. 3, the fundamental frame (e.g., 203) of a previous pair (e.g., 201 and 203) is combined with the harmonic frame (e.g., 205) of a subsequent pair (e.g., 205 and 207) to generate an intermediate fused frame (e.g., 211) by the fusion processor (45). Thus, the frame rate of the ultrasound imaging harmonic and fundamental frame (e.g., 205 and 207) system (10) is improved.

Alternatively, the harmonic frame of a previous pair of harmonic and fundamental frames can be combined with the fundamental frame of a subsequent pair of harmonic and fundamental frames to generate an intermediate fused frame.

Thus, for each subsequent set of transmission for the generation of a pair of harmonic and fundamental frames (e.g., 205 and 207), two fusion frames (e.g., 211 and 213) can be generated by using a frame from the previous pair of harmonic and fundamental frames (e.g., 201 and 203). In embodiment, a set of transmission for the generation of a pair of harmonic and fundamental frames (e.g., 205 and 207) has two transmission pulses. Thus, each pair of subsequently transmitted pulses can generate two fusion frames (e.g., 211 and 213).

In one embodiment, an ultrasound fusion harmonic image (UFHI) mode starts when a user pushes a predetermined button. When in UFHI mode, a first pulse that has minimal harmonic components is transmitted and then the echo of which is received. Subsequently, a second pulse is transmitted and then the echo of which is received. The amplitude and phase of the second pulse are both different from that of the first pulse. The second received beam is adjusted in delay, phase and amplitude for motion compensation and other variations. A harmonic signal is extracted by adding the first received beam and the adjusted second received beam. A filter can be optionally employed to further remove the fundamental signal from the extracted harmonic signal. A fundamental signal is extracted by taking the difference of the first received beam and the adjusted second received beam. The harmonic signal and the fundamental signal are further processed to produce their corresponding magnitude signals. The corresponding magnitude signals of the harmonic signal and the fundamental signal are fused to generate a compounded image.

Figure 5:
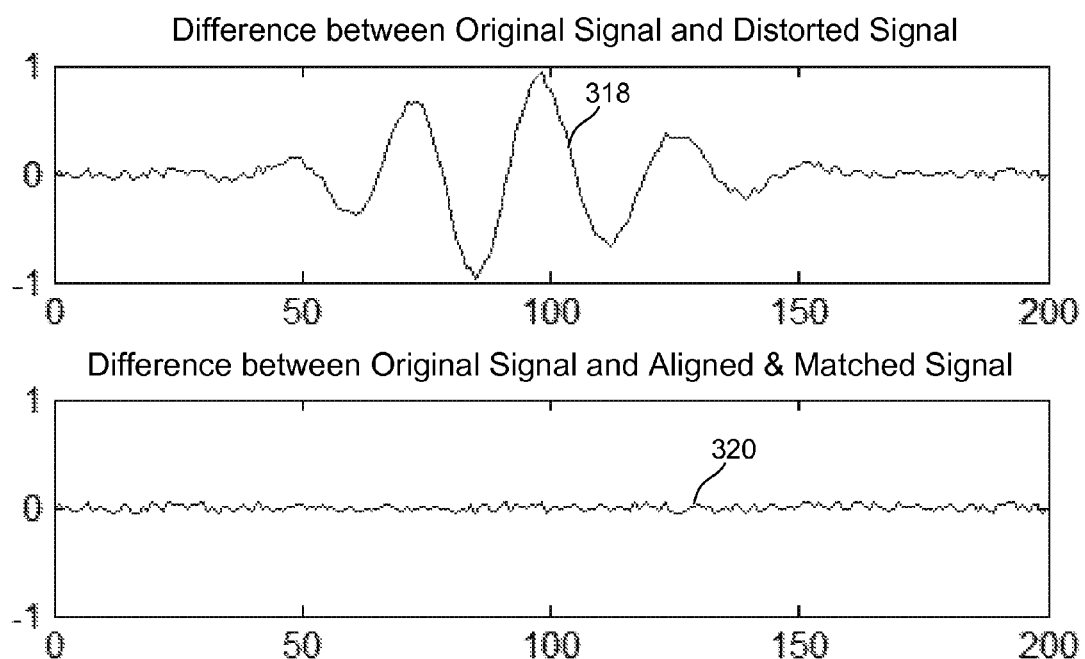
FIGS. 4 and 5 show how to align and match two signals.

FIGS. 4 and 5 illustrate the alignment and matching of two signals. In FIG. 4, the second signal (312) is aligned with the first signal (310) in time to generate the third signal (314), which is further matched with the first signal (310) in magnitude to generate the fourth signal (316). FIG. 5 illustrates the significant reduction from the difference (318) between the first signal (310) and the second signal (312), and the difference (320) between the first signal (310) and the fourth signal (316) that is an aligned and matched version of the second signal (312).

FIG. 6 shows an example of transmit delay based harmonic imaging. In FIG. 6, a first signal (330) and a second signal (332) differ by half cycle delay. The difference (334) between the first signal (330) and the second signal (332) can be used as a signal for harmonic imaging.

FIG. 7 shows an example of transmit amplitude based harmonic imaging. In FIG. 7, a first signal (340) and a second signal (342) differ by amplitude. The difference (344) between the first signal (340) and the scaled second signal (342) can be used as a signal for harmonic imaging.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. An ultrasound imaging system, comprising:
   an ultrasound transducer;
   a transmit beamformer;
   a receiver beamformer;
   a harmonic filter coupled between the ultrasound transducer and the transmit beamformer to reduce transmitted harmonic components;
   a fundamental filter coupled between the ultrasound transducer and the receiver beamformer to reduce received fundamental components;
   a fusion processor to generate multiple frames of fusion images from subsequent frames of ultrasound transmissions;
   a transmit/receive switch to couple either the transmit beamformer or the receive beamformer to the ultrasound transducer;
   a first switch to connect the harmonic filter between the transmit beamformer and the transmit/receive switch when in a first mode and to connect the transmit beamformer to the transmit/receive switch without going through the harmonic filter when in a second mode; and
   a second switch to connect the fundamental filter between the receive beamformer and the transmit/receive switch when in a first mode and to connect the receive beamformer to the transmit/receive switch without going through the fundamental filter when in a second mode;
   wherein the fusion processor combines a harmonic frame derived from a first pair of the subsequent frames with a fundamental frame derived from a second pair of the subsequent frames, or combines a fundamental frame derived from the first pair of the subsequent frames with a harmonic frame derived from the second pair of the subsequent frames, to generate one of the multiple frames.

2. The ultrasound imaging system of claim 1, wherein the harmonic filter is configured to adjust at least one of delay, phase and amplitude of a pulse supplied by the transmit beamformer.

3. The ultrasound imaging system of claim 1, wherein the transmit beamformer is configured to generate two pulses for the two subsequent frames of ultrasound transmissions.

4. The ultrasound imaging system of claim 3, wherein the receiver beamformer is configured to receive and store two beams formed as echoes of the two pulses; and the fusion processor is configured to extract a harmonic frame and a fundamental frame from the two beams.

5. The ultrasound imaging system of claim 4, wherein the fusion processor is configured to perform alignment and matching of the two beams to extract the harmonic frame and the fundamental frame.

6. The ultrasound imaging system of claim 4, wherein the two pulses are identical; and the harmonic filter is applied to a first one of the two pulses and not to a second one of the two pulses.

7. The ultrasound imaging system of claim 4, wherein the ultrasound transducer is excited to transmit multiple amplitude-modulated transmit pulses with different delays for the two subsequent frames of ultrasound transmissions.

8. The ultrasound imaging system of claim 4, wherein the ultrasound transducer is excited to transmit multiple pulses with different amplitudes to extract harmonic signals.

9. The ultrasound imaging system of claim 4, wherein the two pulses differ in at least one of: delay, phase, frequency, duration, width, and amplitude.

10. The ultrasound imaging system of claim 4, wherein the receive beamformer includes a high-dynamic range, low-noise, high-gain amplifier to boost harmonic signals and reduced gain for fundamental signals.

11. The ultrasound imaging system of claim 4, wherein the two pulses are identical; and the fundamental filter is used in receive echoes from a first one of the two pulses and not a second one of the two pulses.

12. An ultrasound imaging system, comprising:
an ultrasound transmitter having a harmonic filter to reduce transmitted harmonic components;
an ultrasound receiver having a fundamental filter to reduce received fundamental components; and
a fusion processor to combine a harmonic frame derived from a first pair of reflected beams with a fundamental frame derived from a second pair of reflected beams, or to combine a fundamental frame derived from the first pair of reflected beams and a harmonic frame derived from the second pair of reflected beams, to generate a fused frame;
wherein:
each pair of reflected beams are generated from a first pulse and a second pulse; and
the harmonic filter is applied to the first pulse to generate a first beam of the pair of reflected beams but not to the second pulse substantially identical to the first pulse.

13. The ultrasound imaging system of claim 12, wherein the ultrasound transmitter includes a switch, which when in a first mode applies the harmonic filter to the first pulse and when in a second mode bypasses the harmonic filter for the second pulse.

14. An ultrasound imaging system, comprising:
an ultrasound transmitter having a harmonic filter to reduce transmitted harmonic components;
an ultrasound receiver having a fundamental filter to reduce received fundamental components; and
a fusion processor to combine a harmonic frame derived from a first pair of reflected beams with a fundamental frame derived from a second pair of reflected beams, or to combine a fundamental frame derived from the first pair of reflected beams with a harmonic frame derived from the second pair of reflected beams, to generate a fused frame;
wherein the fundamental filter is applied to a first beam of the pair of reflected beams but not to a second beam of the pair of reflected beams.

15. The ultrasound imaging system of claim 14, wherein the first beam and the second beam are generated based on identical pulses from the ultrasound transmitter.

16. The ultrasound imaging system of claim 15, wherein the ultrasound receiver includes a switch, which when in a first mode applies the fundamental filter to the first beam and when in a second mode bypasses the fundamental filter for the second beam.

17. The ultrasound imaging system of claim 15, wherein the ultrasound receiver includes a high-dynamic range, low-noise, high-gain amplifier to boost harmonic signals, with reduced gain for fundamental signals.

18. An ultrasound imaging system, comprising:
an ultrasound transducer;
a transmit beamformer;
a receiver beamformer;
a transmit/receive switch to subsequently:
  connect the transmit beamformer to the ultrasound transducer to transmit a first beam into an object,
  connect the receiver beamformer to the ultrasound transducer to receive the first beam reflected from the object,
  connect the transmit beamformer to the ultrasound transducer to transmit a second beam into the object, and
  connect the receiver beamformer to the ultrasound transducer to receive the second beam reflected from the object;
a fusion processor to:
  adjust the reflected second beam to align and match with the reflected first beam to compensate a difference between the received first beam and the received second beam,
  extract a harmonic signal by adding the reflected first beam and the reflected, adjusted second beam,
  extract a fundamental signal by calculating a difference between the reflected first beam and the reflected, adjusted second beam, and
  combine the harmonic signal and the fundamental signal to generate a fused signal that is used to generate an ultrasound image.

\* \* \* \* \*